United States Patent [19]

Kumar et al.

[11] Patent Number: 5,240,972

[45] Date of Patent: Aug. 31, 1993

[54] CARBAMATE MODIFIED SULFONATED AND NON-SULFONATED HYDROXY-FUNCTIONAL POLYURETHANE MACROINIFERTER COMPOUNDS, COPOLYMERS MADE THEREWITH, AND MAGNETIC RECORDING MEDIA PREPARED THEREFROM

[75] Inventors: Ramesh C. Kumar, Maplewood, Minn.; Takatoshi Ohkubo, Atsugi, Japan

[73] Assignee: Minnesota Mining and Manufacturing Company, St. Paul, Minn.

[21] Appl. No.: 876,395

[22] Filed: Apr. 30, 1992

Related U.S. Application Data

[62] Division of Ser. No. 543,361, Jun. 25, 1990, Pat. No. 5,118,580.

[51] Int. Cl.⁵ .................... C08F 2/50; C08F 71/04; C08F 293/00; B32B 27/00
[52] U.S. Cl. ............................. 522/57; 522/81; 522/174; 522/182; 522/183; 525/455; 428/425.9; 428/694; 428/900
[58] Field of Search ............... 428/425.9, 423.7, 900, 428/694; 522/57, 81, 174, 182, 183; 525/455

[56] References Cited

U.S. PATENT DOCUMENTS

| | | | |
|---|---|---|---|
| 3,689,593 | 9/1972 | Jackson | 524/533 |
| 3,787,303 | 1/1974 | Guthrie et al. | 204/159.15 |
| 3,865,898 | 2/1975 | Tobolsky | 260/859 R |
| 4,837,082 | 6/1989 | Harrell et al. | 428/329 |
| 5,057,619 | 10/1991 | Kumar et al. | 556/420 |
| 5,071,578 | 12/1991 | Ohkubo et al. | 428/900 |

FOREIGN PATENT DOCUMENTS

| | | |
|---|---|---|
| 0193084 | 9/1986 | European Pat. Off. |
| 0286376 | 4/1988 | European Pat. Off. |
| 0311935 | 4/1989 | European Pat. Off. |

OTHER PUBLICATIONS

Otsu et al., "Living Radical Polymerizations in Homogeneous Solution by Using Organic Sulfides as Photoiniferters", Polymer Bulletin, 7, 45-50 (1982).

Otsu et al., "Living Mono- and Biradical Polymerizations in Homogeneous System Synthesis of AB and ABA Type Block Copolymers", Polymer Bulletin, 11, 135-142 (1984).

Otsu et al., Makromol. Chemie 27, 142-8 (1958).

Otsu et al., Makromol. Chemie, Rapid Communications 3, 127-132 (1982).

Chujo et al., *Polymer Bulletin*, 8, 239 (1982).

Jones et al., *Journal of Inorganic and Nuclear Chemistry*, 40, 1235 (1978).

Otsu et al, "Living Radical Polymerization in Homogenuous System by Using Iniferter: Design of Block Copolymers", J. Marcomol. Sci.-Chem. A21 (889), pp. 961-977 (1984).

*Primary Examiner*—Susan Berman
*Attorney, Agent, or Firm*—Gary L. Griswold; Walter N. Kirn; Janice L. Dowdall

[57] ABSTRACT

The present invention relates to an inferter compound of the formula $I(T)_n$ wherein I represents the free radical initiator portion of the iniferter compound and wherein I comprises a hydroxy-functional polyurethane polymer which comprises: (i) a polyurethane backbone; (ii) a plurality of cross-linkable hydroxy groups pendant from the polyurethane backbone, wherein the polyurethane backbone has a hydroxy equivalent weight of from about 500 to about 10,000; (iii) at least n organic groups X which can be the same or different pendant from the polyurethane backbone wherein each organic group X is also bonded to a T group; T represents the terminator portion of the iniferter; and n is an integer of at least 1; wherein T and X are organic groups selected so that the T—X bond is capable of dissociating upon being subjected to an appropriate energy source of forming a terminator free radical of the formula $nT\cdot$ and an initiator free radical of the formula $I(\cdot)_n$. The invention also relates to an iniferter which further comprises at least one $SO_3M$ group pendant from the polyurethane backbone, to vinyl/polyurethane copolymers made from the iniferters, to a method of making the copolymers, and to the use of the copolymers in magnetic recording media.

19 Claims, No Drawings

CARBAMATE MODIFIED SULFONATED AND NON-SULFONATED HYDROXY-FUNCTIONAL POLYURETHANE MACROINIFERTER COMPOUNDS, COPOLYMERS MADE THEREWITH, AND MAGNETIC RECORDING MEDIA PREPARED THEREFROM

This is a division of application Ser. No. 07/543,361 filed Jun. 25, 1990, now U.S. Pat. No. 5,118,580.

FIELD OF THE INVENTION

This invention relates to dithiocarbamate modified sulfonated hydroxy functional polyurethane macroiniferter compounds (CSHPU) and to dithiocarbamate modified hydroxy-functional polyurethane macroiniferter compounds (CHPU). The invention also relates to vinyl/sulfonated hydroxy functional polyurethane (vinyl/SHPU) and vinyl/hydroxy functional polyurethane (vinyl/HPU) graft and block copolymers made therewith, respectively, using photoiniferter technology. The invention also relates to the use of the copolymers in magnetic recording media.

BACKGROUND OF THE INVENTION

Magnetic recording media generally include a binder dispersion layer comprising a binder and a pigment overlying a substrate, wherein the pigment is dispersed within the binder. Typically, the pigment is a magnetizable pigment comprising small, magnetizable particles. In some instances, the medium may be in the form of a composite having both back-coat and front-coat binder dispersion layers, although the pigment in the back-coat may or may not be a magnetizable pigment.

It has become desirable to have as high a loading of magnetizable pigment in the magnetic recording media as is reasonably possible. It is often preferred to have a binder dispersion comprising from about 70% to 85% by weight magnetizable pigment relative to the binder with as many magnetizable particles per unit area or unit volume as possible. It is also preferred to have a binder dispersion in which the magnetizable pigment comprises a plurality of small particles having a relatively high specific surface area. Higher pigment loading has the potential to provide high density magnetic recording media capable of storing more information.

Problems, however, remain in the art concerning magnetic recording media having a relatively high loading of magnetizable pigment. To begin with, magnetizable pigments tend to agglomerate, and they are difficult to properly and fully disperse within the binder. Wetting agents, or dispersants, are often employed to facilitate such dispersion. For higher pigment loading, i.e., the use of greater amounts by weight and number of magnetizable particles, greater amounts of such dispersants are required, which is not always desirable. There are a number of reasons for using as little dispersant as possible. Costs, for example, can be reduced by using less dispersant. Additionally, binder dispersions can be more readily and reproducibly prepared when less dispersant is used. Further, excess dispersant may have a tendency to bloom from a cured binder dispersion over time, leading to contamination of a recording head or the like, or causing a change in the physical or chemical characteristics of the media.

Another problem in the art is that the viscosity of a binder dispersion generally increases with higher loading of magnetizable pigment. If the dispersion is too viscous, it can be difficult to apply to the substrate, and good magnetic orientation of the pigment, i.e., a squareness ratio of 0.75 or more, can be hard to obtain. The squareness ratio (Br/Bm), which is the ratio of the remnant saturation induction, or residual magnetization (Br), to the saturation induction, or saturation magnetization (Bm), refers to the effectiveness of the orientation of the magnetic particles. For randomly-oriented particles, the squareness ratio is 0.5 and for ideally and perfectly oriented particles, the ratio is equal to 1.0. Values for the squareness ratio, of media exhibiting good performance, normally fall around 0.75 to 0.85. In general, an increase in the squareness ratio is reflected by an improvement in orientation characteristics and electromagnetic properties.

To help alleviate these problems with high pigment loading, binder compositions having internal dispersants have been developed. Such compositions comprise polymers with functional moieties pendant from the polymer backbone that help disperse the magnetizable pigment. As a result of using these compositions, less dispersant is needed for dispersion of magnetizable pigment in the binder.

Copending U.S. Application Ser. No. 07/429,720, filed Oct. 31, 1989, now U.S. Pat. No. 5,071,578, which is a continuation-in-part of U.S. Application No. 07/295,046, filed Jan. 6, 1989 (assigned to the assignee of the present case) discloses a curable polymer having internal dispersants which comprises a sulfonated, hydroxy-functional polyurethane (SHPU) resin. The SHPU resin can be used as part of a binder layer in magnetic recording media. The application discloses the excellent dispersion of magnetizable pigment within the SHPU resin and the ease of application of the dispersion onto a suitable substrate.

There are, however, certain types of media constructions where high glass transition temperature (Tg) and abrasion resistance in the uncured state, and high final coating modulus are both desirable and necessary, for example, where stiffer tapes are needed for better handling in the recording and playback machine, or where manufacturing methods dictate the necessity of having high initial strength coatings that are resistant to damage during manufacture or processing.

In order to increase the durability, running properties, and reliability of magnetic recording media, attempts have been made to add a hard material to the pigment-containing binder.

U.S. Application Ser. No. 07/315,304, filed Mar. 1, 1989, now abandoned, (assigned to the assignee of the present case) discloses a curable magnetic binder composition which comprises a curable sulfonated, hydroxy functional polyurethane which is combined with another polymer, usually called a "hard resin", to attain the desired high $T_g$ for optimum binder performance in certain applications. The "hard resin" disclosed in 07/315,304 is a cross-linkable hydroxy functional vinyl chloride having incorporated therein $SO_3M$ groups wherein M represents $H^+$ or a metal cation. Although polymer blends of the type disclosed in 07/315,304 are very useful, the dispersing character of the binder system can sometimes diminish. In addition, only a few types of hard resins have been found to be functional because of a general lack of polymer/polymer compatibility. For example, hard resins based upon acrylic monomers have not been found to be usefully compatible with the preferred types of polyurethane binder resins.

In order to optimize binder performance single polymer systems have been developed in which a "hard resin" is grafted onto a polyurethane having pendant hydroxy and sulfonate groups rather than blended therewith.

Concurrently filed U.S. Pat. Application Ser. No. 07/543,343, Carlson et. al., a continuation of which was filed Mar. 13, 1992 to which was assigned U.S. Pat. application Ser. No. 07/852,937 (assigned to the assignee of the present case) discloses vinyl/SHPU copolymers made via the utilization of macromonomer diols and sulfonate diols. The method generates quality material; however, it is limited as to the selection of monomers that can be used (i.e., non-hydroxy functional monomers).

Copending, concurrently filed U.S. Pat. Application Ser. No. 07/543,230, Kumar et al., (assigned to the assignee of the present case), now U.S. Pat. No. 5,134,035, describes sulfonated, hydroxy and thiol functional polyurethanes and graft copolymers made therewith via free radical polymerization of vinyl monomer in the presence of the sulfonated, hydroxy and thiol functional polyurethane. Although the method has a number of distinct advantages it does not provide for a high degree of tailorability of the copolymers prepared therewith.

A need thus exists for a single polymer magnetic binder system which does not need to be blended with a hard resin, which can be "tailor" made from a wide variety of monomers so that a wide spectrum of physical properties can be introduced, which possesses a high $T_g$, which possesses good mechanical properties, which disperses pigment well, and which is capable of being cross-linked by isocyanate curatives.

We have found such a copolymer which is prepared via photoiniferter technology. Photoiniferter technology is a recently developed technology which allows for the polymerization of block copolymers from various monomers. The control of the polymerization provided by the photoiniferter technology permits "tailoring" of the block copolymers formed thereby so that a polymer having a wide spectrum of physical properties can be prepared. Such high precision tailoring is not possible with previously known polymerization methods such as thermal polymerization.

The term "iniferter", or "photoiniferter" as it is also known, refers to a chemical compound that has a combined function of being a free radical initiator, transfer agent, and terminator, the term "iniferter" being a word formed by the underlined portions of the terms identifying these functions. The photo portion of the term indicates that the polymerization is photolytically induced. This term and its use in the production of block copolymers is well known, particularly because of the work of Takayuki Otsu of the Department of Applied Chemistry, Osaka City University, Osaka, Japan. This work is discussed, for example, in an article by Otsu et al entitled "Living Radical Polymerizations in Homogeneous Solution by Using Organic Sulfides as Photoiniferters", *Polymer Bulletin*, 7, '45–50 (1982), an article by Otsu et al entitled "Living Mono- and Biradical Polymerizations in Homogeneous System Synthesis of AB and ABA Type Block Copolymers", *Polymer Bulletin*, 11, 135–142 (1984), and in European Patent Application No. 88303058.7, Publication No. 0 286 376, Publication Date Oct. 12, 1988.

Copending U.S. Application Ser. No. 07/596,575, filed Oct. 11, 1990, which is a continuation of U.S. Application Ser. No. 07/356,650, filed May 19, 1989, which is a Continuation-In-Part of U.S. Application Ser. No. 07/212,594, Ali, et al., filed Jun. 28, 1988 (assigned to the assignee of the present case) discloses the use of iniferter technology in the preparation of acrylic block copolymers having the requisite physical properties making them suitable for use in pressure-sensitive adhesive compositions.

Copending U.S. Application Ser. No. 07/939,569, filed Sep. 3, 1992, which is a continuation of Application Ser. No. 07/465,594, filed Jan. 18, 1990, which is a continuation of Application Ser. No. 07/212 593, Andrus Jr., et al., (also assigned to the assignee of the present case) discloses the use of iniferter technology in the preparation of acrylic block copolymers which can be tailored to provide optical clarity and resistance to oxidative and photochemical degradation.

Copending U.S. Application Ser. No. 07/393,550, Kumar, et al., now U.S. Pat. Nos. 5,057,619 and 5,200,436, (assigned to the assignee of the present case) provides novel siloxane macroiniferter compounds which can be used in making tailor-made vinyl-siloxane block copolymers.

To our knowledge there has been no use of iniferter technology in the preparation of vinyl/SHPU or vinyl/hydroxy-functional polyurethane (vinyl/HPU) graft or block copolymers. Nor has there been any use of such polymers in magnetic recording media.

BRIEF DESCRIPTION OF THE INVENTION

A first aspect of the present invention relates to a novel dithiocarbamate modified sulfonated hydroxy-functional polyurethane (CSHPU) macroiniferter compound and a novel dithiocarbamate modified hydroxy-functional polyurethane (CHPU) macroiniferter compound. The macroiniferter compounds can be used in making novel tailor-made graft and block copolymers via sequential polymerization steps.

The CHPU iniferter compound has the formula $I(T)_n$ wherein I represents the free radical initiator portion of the iniferter compound and wherein I comprises a hydroxy-functional polyurethane polymer which comprises: (i) a polyurethane backbone; (ii) at least two cross-linkable hydroxy groups pendant from the polyurethane backbone, wherein the polyurethane backbone has a hydroxy equivalent weight of from about 500 to about 10,000; (iii) at least n organic groups X which can be the same or different pendant from the polyurethane backbone wherein each organic group X is also bonded to a T group; T represents the terminator portion of the iniferter; and n is an integer of at least 1; wherein T and X are organic groups selected so that the T—X bond is capable of dissociating upon being subjected to an appropriate energy source of forming a terminator free radical of the formula $nT\cdot$ and an initiator free radical of the formula $I(\cdot)_n$ the initiator free radical being sufficiently reactive to initiate free radical polymerization of free radically polymerizable monomer and the terminator radical being insufficiently capable of initiating free radical polymerization of free radically polymerizable monomer but capable of rejoining with the initiator free radical or a free radical polymer segment free radically polymerized with the initiator free radical.

The CSHPU iniferter compound has the formula of $I(T)_n$ but further comprises at least one $SO_3M$ group pendant from the polyurethane backbone, wherein the polyurethane backbone has an $SO_3M$ equivalent weight of from about 2,000 to about 100,000, and wherein M is selected from the group consisting of H+, NR4+ wherein R can be H+ or an alkyl group, Li+, Na+, K+, and mixtures thereof.

A second aspect of the present invention relates to the novel vinyl/SHPU and vinyl/HPU block and graft copolymers made using the novel CSHPU and CHPU macroiniferter compounds. The novel copolymers can be used for a number of purposes including as binders in magnetic recording media.

A third aspect of the present invention relates to a dispersion for use in magnetic recording media. The dispersion comprises a binder composition comprising either copolymer described above. A magnetizable pigment is dispersed within the composition.

A fourth aspect of the present invention relates to a composite for magnetic recording. The composite includes a substrate having a front side and a back side. A cured dispersion comprising a binder composition comprising either above described copolymer is coated on at least one side of the substrate. A magnetizable pigment is dispersed in the cured dispersion.

A fifth aspect of the invention relates to a novel method of making the vinyl/SHPU and vinyl/HPU copolymers.

The novel vinyl/SHPU copolymers of the present invention overcome the difficulties of known binders used in magnetic recording media in that a substantial portion of the hard resin is grafted onto the SHPU or HPU rather than mixed therewith which produces very good compatibility in terms of mechanical properties and optical clarity. These grafted vinyl/SHPU polyurethane copolymers disperse magnetic pigment as well as sulfonated hydroxy-functional polyurethane itself.

The novel vinyl/HPU copolymers also overcome the difficulties of known binders in that a substantial portion of the hard resin is pendant from the hydroxy functional polyurethane rather than mixed therewith which produces good compatibility. These copolymers are typically combined with a dispersant in order to provide a dispersion useful in magnetic recording media. Moreover, both copolymers possess glass transition temperatures which are higher than the glass transition temperatures of the sulfonated hydroxy functional polyurethane thus resulting in a highly durable material.

The invention provides an inferter compound of the formula $I(T)_n$ wherein

I represents the free radical initiator portion of the iniferter compound and wherein I comprises a hydroxy-functional polyurethane polymer which comprises:
  (i) a polyurethane backbone;
  (ii) at least two cross-linkable hydroxy groups pendant from the polyurethane backbone, wherein the polyurethane backbone has a hydroxy equivalent weight of from about 500 to about 50,000;
  (iii) at least n organic groups X which can be the same or different pendant from the polyurethane backbone wherein each organic group X is also bonded to a T group;

T represents the terminator portion of said iniferter; and
n is an integer of at least 1;
wherein T and X are organic groups selected so that the T-X bond is capable of dissociating upon being subjected to an appropriate energy source of forming a terminator free radical of the formula nT· and an initiator free radical of the formula $I(·)_n$ the initiator free radical being sufficiently reactive to initiate free radical polymerization of free radically polymerizable monomer and the terminator radical being insufficiently capable of initiating free radical polymerization of free radically polymerizable monomer but capable of rejoining with the initiator free radical or a free radical polymer segment free radically polymerized with the initiator free radical.

The invention also provides a copolymer comprising:
a copolymer of the formula $I(BT)_n$ which can be made by the utilization of an iniferter compound represented by the formula $I(T)_n$ wherein I represents the free radical initiator portion of the iniferter compound of the formula $I(T)_n$ and wherein I comprises a hydroxy-functional polyurethane polymer which comprises:
  (i) a polyurethane backbone;
  (ii) at least two cross-linkable hydroxy groups pendant from the polyurethane backbone, wherein the polyurethane backbone has a hydroxy equivalent weight of from about 500 to about 50,000;
  (iii) at least n organic groups X which can be the same or different pendant from the polyurethane backbone wherein each organic group X is also bonded to a T group;

T represents the terminator portion of the iniferter; and
n is an integer of at least 1;
wherein T and X are organic groups selected so that the T—X bond is capable of dissociating upon being subjected to an appropriate energy source of forming a terminator free radical of the formula nT· and an initiator free radical of the formula $I(·)_n$ the initiator free radical being sufficiently reactive to initiate free radical polymerization of free radically polymerizable monomer and the terminator free radical being insufficiently capable of initiating free radical polymerization of free radically polymerizable monomer but capable of rejoining with the initiator free radical or a free radical polymer segment free radically polymerized with the initiator free radical; and B represents at least one polymer segment comprising polymerized free radically polymerizable monomer; wherein the weight ratio of the iniferter to the free radically polymerizable monomer ranges from about 5:95 to about 95:5.

The invention also provides a method of making a copolymer which comprises the steps of:
(a) mixing an (1) iniferter compound represented by the general formula $I(T)_n$ wherein I represents the free radical initiator portion of the iniferter compound and wherein I comprises a hydroxy-functional polyurethane polymer which comprises:
  (i) a polyurethane backbone;
  (ii) at least two cross-linkable hydroxy groups pendant from the polyurethane backbone, wherein the polyurethane backbone has a hydroxy equivalent weight of from about 500 to about 50,000;
  (iii) at least n organic groups X which can be the same or different pendant from the polyurethane backbone wherein each organic group X is also bonded to a T group;

T represents the terminator portion of said iniferter; and
n is an integer of at least 1;
wherein T and X are organic groups selected so that the T-X bond is capable of dissociating upon being subjected to an appropriate energy source of forming a terminator free radical of the formula nT· and an initiator free radical of the formula $I(·)_n$ the initiator free radical being sufficiently reactive to initiate free radical polymerization of free radically polymerizable monomer and the terminator radical being insufficiently capable of initiating free radical polymerization of free radically polymerizable monomer but capable of rejoining with the initiator free radical or a free radical polymer segment free radically polymerized with the initiator free radical and (2) a monomer charge comprising free radically polymerizable monomer capable of being polymerized in order to form a polymeric segment; at a weight ratio of iniferter to free radically polymerizable monomer of about 5:95 to about 95:5, in order to form a mixture;

(b) exposing the mixture of (a) to an energy source capable of forming free radicals $nT\cdot$ and $I(\cdot)_n$;

(c) maintaining the exposure of (b) until the free radically polymerizable monomer polymerizes with the radical $I(\cdot)_n$ to form a free radical polymer segment represented by the formula $I(B\cdot)_n$ wherein B represents a polymeric segment formed of the free radically polymerizable monomer;

(d) terminating said exposure whereby to cause $I(B\cdot)_n$ and $nT\cdot$ to combine to form a copolymer represented by the formula $I(BT)_n$.

DETAILED DESCRIPTION OF THE INVENTION

The first step in the preparation of the CSHPU and CHPU macroiniferters is the preparation of sulfonated hydroxy-functional polyurethane (SHPU) and hydroxy-functional polyurethane (HPU), respectively.

I. Dithiocarbamate Modified Sulfonated Hydroxy-Functional Polyurethane (CSHPU) Macroiniferter

Compound and Preparation Thereof

The first step in the preparation of the dithiocarbamate modified sulfonated hydroxy-functional polyurethane (CSHPU) macroiniferter compound is the synthesis of SHPU. SHPU can be prepared according to the method described in Ohkubo et al. U.S. Pat. Application Ser. No. 07/429,720, filed Oct. 31, 1989 entitled "Sulfonated Hydroxy-Functional Polyurethane Binder for Magnetic Recording Media", which is a continuation-in-part of U.S. Pat. Application Ser. No. 07/295,046, filed Jan. 6, 1989 (assigned to the assignee of the present invention), both incorporated by reference herein.

I(a) Sulfonated, Hydroxy-Functional Polyurethane Polymer (SHPU)

I(a)(i) Polyurethane Backbone

The polyurethane backbone of the sulfonated, hydroxy-functional polyurethane polymer described in U.S. Pat. Application Ser. No. 07/429,720, now U.S. Pat. No. 5,071,578, is similar to the polyurethane backbone of the copolymer of the present invention.

The preferred polyurethane backbone may be viewed as comprising a plurality of segments, each segment being a structural fragment resulting from the reaction of a polyol with a polyisocyanate. The individual segments can be viewed as being soluble (hydrophobic) or insoluble (hydrophilic) in character. The term "insoluble" as used herein is meant to refer to a polyurethane segment of such a character that if a moderate to high molecular weight polyurethane (for example about 50,000 weight average) were made exclusively of the segment, the polymer would not be soluble in organic solvents such as methyl ethyl ketone, cyclohexanone, toluene, or tetrahydrofuran. On the other hand, a "soluble" segment is one of such a character that if a moderate to high molecular weight polyurethane (for example 50,000 weight average) were made exclusively of the segment, the polymer would be soluble in the abovementioned solvents. Although the polyurethane backbones may solely comprise hydrophobic or hydrophillic segments, the preferred polyurethane backbones for use in the present invention comprise both soluble and insoluble segments.

Herein, soluble (hydrophobic) and insoluble (hydrophilic) segments are generally identified and distinguished by relative molecular weight, chain length, and/or relative amount of polar functionality or character. That is, one way for identifying or defining these segments involves a comparison of the ratios of the number of carbon atoms to polar groups in the segment precursor. The term "polar group" as used in this context is meant to refer to such highly polar groups as hydroxy-, sulfonate-, amino-, urethane-, and ureagroups, but not ester, carbonate, or ether functionality. In general, a ratio of less than about 3:1 identifies a precursor to an insoluble segment; whereas, a ratio of greater than about 3:1 identifies a precursor to a soluble segment. For example, under this model neopentyl glycol (5 carbons/2 polar groups) is a precursor to an insoluble segment, and a polycaprolactone triol such as Union Carbide Tone TM 0305 (about 28 carbons/3 polar groups) is a precursor to a soluble segment.

I(a)(ii) Sulfonate Groups

At least one $SO_3M$ group is pendant from the polyurethane backbone. The term "pendant" as used herein refers both to a moiety bonded to an interior portion of the polyurethane backbone as well as to a moiety bonded to a terminal portion of the polyurethane backbone. The polyurethane backbone has an SO M group equivalent weight of about 2,000 to about 100,000, preferably about 5,000 to about 30,000. The cation M designates a cation selected from the group consisting of $H^+$, the alkali metal cations, i.e., $Na^+$, $Li^+$, and $K^+$, and $NR_4^+$ wherein R can be hydrogen or an alkyl group. When R is an alkyl group, R preferably comprises a $C_1$ to $C_4$ alkyl. M is preferably selected from the group consisting of $Li^+$, $Na^+$, $K^+$, and mixtures thereof, since the corresponding acids, if present in the final polymer, may tend to produce an overall polymer that is subject to decomposition. Most preferably, M comprises $Na^+$ for reasons of commercial availability.

Preferably, the $SO_3M$ group is an aromatic $SO_3M$ group, (i.e. pendant from an aromatic moiety incorporated into the polyurethane backbone) wherein M is $Na^+$, since at least one example of this type of compound is readily available from commercial sources, it can be easily incorporated into the polyurethane backbone, and its properties are well known. This preferred aromatic sodium sulfonate compound is dimethyl sodium sulfoisophthalate (DMSSIP).

I(a)(iii) Hydroxy Groups

At least two cross-linkable hydroxy groups are pendant from the polyurethane backbone. The polyurethane backbone has a cross-linkable hydroxy group equivalent weight of from about 500 to about 50,000, preferably about 1,000 to about 5,000. Preferably, a majority, more preferably 90% or more, and most preferably all, of the cross-linkable hydroxy groups are pendant from hydrophobic polymer chain segments. That is, the cross-linkable hydroxy groups are positioned within the polymer at locally hydrophobic sites. A number of hydroxy groups which are pendant from the polyurethane backbone are reacted with an X contributing compound such as 2-chloropropionyl chloride as a first step in preparing the macroiniferter and thus are not available for cross-linking. The majority of the remaining hydroxy groups are available for cross-linking of the copolymer prepared from the macroiniferter.

By the term "locally hydrophobic" it is meant that the cross-linkable hydroxy groups are located in portions of the polymer that do not include, in the immediate vicinity of a hydroxy group, any moieties that are substantially polar or hydrophilic. Preferably, the hydroxy groups are each positioned in polymer chain segments having lengths of at least about 5 atoms separating the hydroxy group from the nearest polar group. Alternatively phrased, if the hydroxy group is positioned in a substantially hydrophobic fragment or segment whose precursor has a molecular weight of at least about 180, and preferably about 200 to about 1,000, it will be considered to be in a hydrophobic environment (or soluble segment). Most preferably, the hydroxy functionality is substantially centrally positioned within such a fragment or segment. The term "cross-linkable" and variants thereof, when used to refer to moieties in a polymer, is meant to refer to moieties available for cross-linking in final cure. It is not meant or implied that all cross-linkable moieties are necessarily cross-linked during final cure.

I(b) A Method of Preparing the Sulfonated, Hydroxy-Functional Polyurethane (SHPU)

SHPU can be prepared by reacting a polyol with a sulfonated polyisocyanate having at least two reactive isocyanate groups. The polyol is generally hydrophobic. Preferably the polyol has at least three reactive hydroxy groups and has a hydroxy equivalent weight of at least about 60. The polyol is present in a sufficient amount such that there is at least about a 67% excess of reactive hydroxy groups relative to reactive isocyanate groups.

Typically, the polyol is a triol. Preferred triols are triols having a molecular weight greater than about 180. Most preferred are triols having a molecular weight of from about 200 to about 1,000. A preferred class of triols comprises polycaprolactone triols. One particularly useful triol is a polycaprolactone triol having a hydroxy equivalent weight of about 180 and molecular weight of approximately 540. One such high molecular weight triol is available under the trade designation Tone ™ 0305 from Union Carbide Company. Other useful triols include polypropylene oxide triol, and polyester triols other than polycaprolactone triols, e.g. butylene adipate triols.

Preferably the hydroxy groups in the triol are primary in order to facilitate rapid reaction with the X contributing group such as an acyl halide and in order to facilitate curing of the resultant copolymer with a curing agent. The reaction of a primary alcohol with a sulfonated polyisocyanate is relatively rapid at temperatures of about 45° C. to 70° C. In some instances catalysts, such as dibutyltin dilaurate or dimethyltin dilaurate, may be used to facilitate reaction. It is foreseen, however, that some secondary triols may be utilized according to the present invention. It is also foreseen that mixtures of various triols may be utilized.

The sulfonated polyisocyanate can be prepared by reacting a sulfonated diol with an excess of polyisocyanate. Preferably, there is at least a 30% excess of isocyanate functionality in the polyisocyanate relative to hydroxy functionality in the sulfonated diol.

A wide variety of polyisocyanates may be utilized. A particularly well-known and useful class of polyisocyanates are diisocyanates such as diphenylmethane diisocyanate. Other useful diisocyanates include: isophorone diisocyanate, toluene diisocyanate, hexamethylene diisocyanate, tetramethylene diisocyanate, and p-phenylene diisocyanate. It is noted that mixtures of diisocyanates can also be used.

A preferred class of sulfonated diols (also referred to herein as "sulfonated monomers") can be prepared from the reaction of from about two to about four equivalents of an appropriate diol per equivalent of dimethyl sodium sulfoisophthalate (DMSSIP). The isophthalate includes two ester groups that can be readily esterified, by reaction with two equivalents of diol, to lead to an extended dio having an aromatic sulfonate group therein. In some instances, catalysts such as tetrabutyltitanate may be used to facilitate the reaction.

The reaction is generally represented by the following scheme:

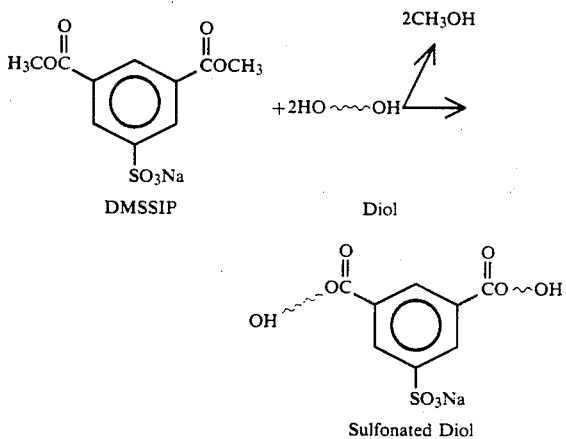

A variety of diols may be utilized. Also, mixtures of diols can be used. A preferred class of diols are the polycaprolactone diols having a hydroxy equivalent weight of from about 200 to 2,000. One such material is Tone ™ 0210, available from Union Carbide Company. Tone ™ 0210 is a polycaprolactone diol having a hydroxy equivalent weight of about 415, a molecular weight of about 825, available from Union Carbide, which is a precursor to a sulfonated diol. The result of reaction of about 4 equivalents of Tone ™ 0210 per equivalent of DMSSIP is a sulfonated diol having a hydroxy equivalent weight of about 603 and a centrally located aromatic sulfonate group.

Other diols which may be reacted with DMSSIP, in order to provide a sulfonated monomer include: polyether diols such as polytetramethylene glycols and polypropylene glycols; polycarbonate diols such as Duracarb 120, a polycarbonate diol available from PPG Industries, Inc. and, polyester diols, such as a polyester diol that is the reaction product of adipic acid and butane diol. Additionally, sodium dimethyl-5-sulfoisophthalate may be utilized with: other diesters or diacids including dimethyl isophthalate, dimethyl terephthalate, and dimethyl adipate; and, diols to produce copolyester diols containing sulfonate. Some examples of such diols are: ethylene glycol; propylene glycol; 1,3-propane diol; 1,4-butane diol; 1,5-pentane diol; 1,6-hexane diol; neopentyl glycol; diethylene glycol; dipropylene glycol; 2,2,4-trimethyl-1,3-pentane diol; 1,4-cyclohexanedimethanol; ethylene oxide and/or propylene oxide adduct of bisphenol A; ethylene oxide and/or propylene oxide adduct of hydrogenated bisphenol A; polyethylene glycol; polypropylene glycol; and, polytetramethylene glycol.

Optionally, it may be desirable to use other polyols to prepare the polyurethane backbone in order to give preferred characteristics to the resultant copolymer. For example, chain extension agents may be incorporated into the polyurethane backbone, to improve ductility or strength characteristics. Such polyols include neopentyl glycol; 1,4-butane diol; 1,6- hexane diol; cyclohexane dimethanol; ethylene glycol; and polyester polyols such as Tone TM 0210 and Tone TM 0230, otherwise referred to herein as non-sulfonated diols. Tone TM 0230 is a polycaprolactone diol having a molecular weight of 1,268 and a hyroxy equivalent weight of 634, available from Union Carbide Company. Preferably, at least some low molecular weight diols (less than about 120), i.e., non-sulfonate-containing diols, are used to provide preferred characteristics to the resultant copolymer. Also, higher molecular weight non-sulfonated diols, such as the polycaprolactone diols Tone TM 0210 or Tone TM 0230, may be used to provide preferred characteristics to the product. Optionally, it may be possible to include fluorinated diols, such as $C_8F_{17}SO_2[(CH_2)_2OH]_2$ in an amount such that the fluorinated diol comprises about 1 to about 20 weight percent of the polyurethane backbone. It is further noted that for any of the reactants mentioned, mixtures of materials can be utilized.

A preferred method of preparing SHPU comprises the reaction of the three key components described above: the sulfonated diol; the polyisocyanate; and the triol. This preferred method shall be referred to herein as the "prepolymer synthetic method". This method is designed to ensure that substantially all of the unreacted hydroxy groups in the resin that are available for further reaction or final cure are those hydroxy groups that are pendant from the triol, i.e., the hydrophobic segment precursor. It is noted that if the diol is also a hydrophobic, i.e., soluble, material, it may not be necessary to ensure that all unreacted hydroxy groups result from the triol.

In a first step, the sulfonated diol and any other optional polyols such as non-sulfonated diols, are reacted with an excess of the polyisocyanate to form a sulfonated polyisocyanate. There should be a sufficient excess of isocyanate functionality for substantially complete reaction of the diol hydroxy groups. For example, there should be at least about a 5 mole % excess of reactive isocyanate functionality in the polyisocyanate relative to hydroxy functionality in the diol and optionally-added polyols. This provides a sulfonated polyisocyanate with relatively little, if any, reactive hydroxy functionality for later cross-linking or further reaction.

In a second step, the sulfonated polyisocyanate product of the first step is reacted with an excess of the triol. Typically, the triol reactant has a relatively high molecular weight, i.e. a molecular weight of at least about 180, preferably about 200 to 1,000. The triol should have little other polar functionality other than the hydroxy groups, and the hydroxy groups should be well spaced in the triol. Preferably, there is at least a 67% excess of hydroxy functionality in the triol relative to isocyanate functionality in the sulfonated polyisocyanate.

As one example of the preferred prepolymer synthetic method, a sulfonated diol monomer, neopentyl glycol, and diphenylmethane diisocyanate are combined in methyl ethyl ketone solvent in a ratio such that the number of isocyanate groups per hydroxy group is initially about 2. After all available hydroxy groups have been reacted, a prepolymer is obtained containing an excess of isocyanate. The prepolymer is subsequently reacted with a hydrophobic triol such that the ratio of isocyanate groups to hydroxy groups is within the range of about 0.3 to about 0.6. The resultant SHPU has cross-linkable hydroxy groups pendant from hydrophobic polymer chain segments comprising the triol.

II. Dithiocarbamate Modified Hydroxy-Functional Polyurethane (CHPU) Macroiniferter Compound and Preparation Thereof The first step in the preparation of the dithiocarbamate modified hydroxy-functional polyurethane (CHPU) macroiniferter compound is the synthesis of a hydroxy-functional polyurethane (HPU).

II(a). Hydroxy-Functional Polyurethane (HPU)

Hydroxy-functional polyurethane polymers (HPU) which can be used in forming the CHPU macroiniferter compound are described in Hassell et al., U.S. Pat. No. 4,837,082 (assigned to the assignee of the present case) incorporated by reference herein. The HPU used herein is similar to SHPU, which was previously described, except that the HPU contains no pendant sulfonate groups. At least two cross-linkable hydroxy groups should be pendant from the polyurethane backbone such that the polyurethane backbone has a hydroxy equivalent weight of from about 500 to about 50,000.

III. Placement of One or More X, Groups on SHPU or HPU

The second step involved in the preparation of the CSHPU or CHPU macroiniferter compound is the placement of one or more pendant X' groups which can be the same or different on the SHPU or HPU by the reaction of an X contributing compound with at least one hydroxy group of the SHPU or HPU. The following is a general formula of the monovalent X' group:

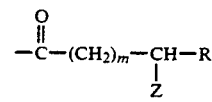

wherein R is a monovalent moiety selected from the group consisting of hydrogen, $C_{1-4}$ alkyl, $C_{1-4}$ fluoroalkyl including at least one fluorine atom, aryl, and substituted aryl; Z is selected from the group consisting of $Cl^-$, $Br^-$, $OTS^-$, and mesylate; and m is an integer of 0 to 10. Examples of specific X' groups include but are not limited to the following: 2-chloro-propionyl, 1-chloro-propionyl, and 1-chloro-2-chloro-propionyl. Preferably, the X' group comprises 2-chloro-propionyl due to the commercial availability of X contributing compound 2-chloropropionyl chloride.

Typically, the SHPU or HPU is first dissolved in a suitable organic solvent such as tetrahydrofuran (THF), methyl ethyl ketone (MEK), and the like, at about 25 to about 45, preferably about 30 to about 35 weight percent solids. Next, about 0.02 to about 1, preferably about 0.04 to about 0.05, weight percent solids of an organic base (based upon 100 weight percent solids SHPU or HPU) is added. Examples of suitable organic bases include but are not limited to the following: triethylamine, pyridine, napthalene, and the like. Preferably, the organic base comprises triethylamine. The components are typically combined in a suitable corrosion resistant vessel equipped with a means of agitation and a nitrogen inlet.

Next, an X contributing compound such as 2-chloropropionyl chloride is added to the reaction vessel at about $-10°$ C. to $5°$ C. in order to control the exotherm, preferably at about $0°$ C. to $3°$ C. If the temperature is too high a charred solution is obtained. If the temperature is too low unreacted X contributing compound remains which can contaminate the reaction mixture during subsequent reactions. The following is a general of commercial availability. Examples of suitable X contributing compounds include but are not limited to the following: 2-chloropropionyl chloride, 2-chloropropionyl tosylate, 1-chloropropionyl chloride, 1-chloro-2-chloro propionyl chloride, etc. Preferably, the X contributing compound comprises 2-chloropropionyl chloride for reasons of commercial availability. The X contributing compound should be added to the solution containing SHPU or HPU and an organic base such as triethylamine at a temperature ranging from about $-10°$ C. to about $5°$ C., preferably about $0°$ to about $3°$ C. and maintained at that temperature for at least about one hour. If the X contributing compound is added at a temperature below about $-2°$ C., the reaction proceeds too slowly. If the X contributing compound is added at a temperature above about $5°$ C., the reaction proceeds too quickly and discoloration can occur. Afterwards the temperature is allowed to rise to room temprature (i.e., about $22°-25°$ C.) for about one hour until the reaction is completed.

The following reaction demonstrates the placement of two pendant X' groups on a specific SHPU.

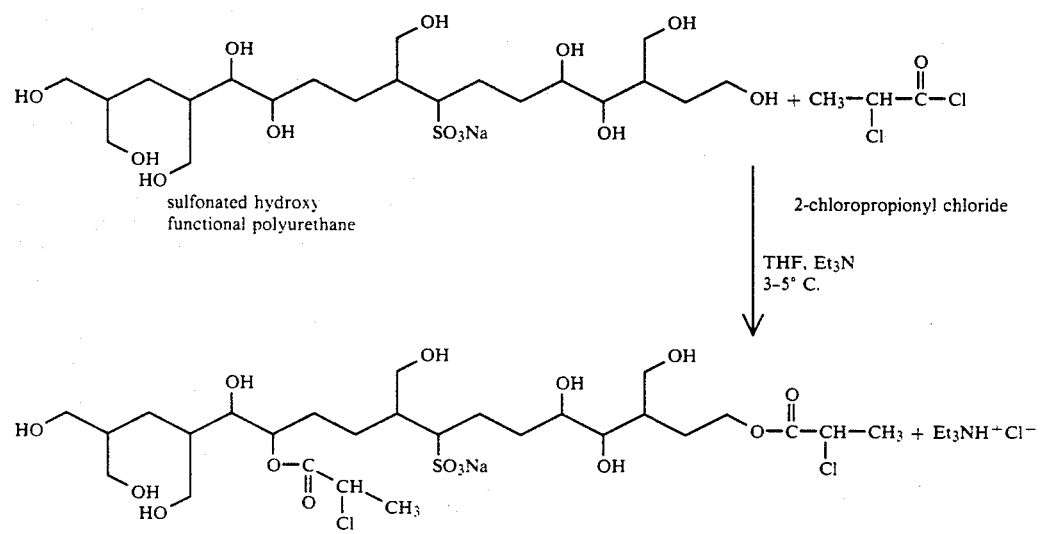

formula of the X contributing compound:

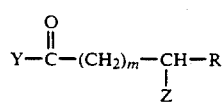

wherein Y is selected from the group consisting of $Cl^-$, $Br^-$, $OH^-$ and anhydride, and R, Z, and m are as defined above. Preferably, R is a methyl radical, Z is a chloride radical, and Y is a chloride radical for reasons IV. Placement of a Photoiniferter on the SHPU or HPU Having One or More Pendant X' Groups The third step involved in the preparation of the CSHPU or CHPU macroiniferter Compound is the placement of a photoiniferter or photoiniferters on the X' group or groups pendant from the SHPU or HPU. The following reaction demonstrates the placement of a photoiniferter on each X' group of a specific sulfonated hydroxy functional polyurethane.

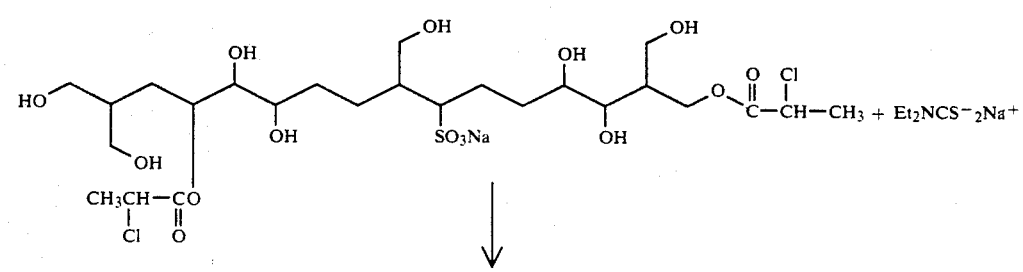

-continued

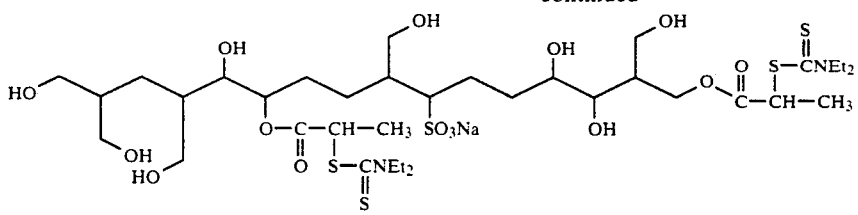

The incorporation of a photoiniferter on SHPU or HPU involves the reaction of SHPU or HPU having one or more pendant X' groups with a nucleophile in the presence of a polar organic solvent Useful nucleophiles include, but are not limited to, dithiocarbamates of the general formula

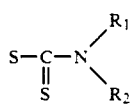

wherein $R_1$ and $R_2$ are monovalent moieties selected from the group consisting of hydrogen, $C_{1-4}$ alkyl, $C_{1-4}$ fluoroalkyl including at least one fluorine atom, aryl and substituted aryl, $R_1$ and $R_2$ being the same or different and being selected so as that they will not prevent the initiator radical from initiating free radical polymerization or the combining of the terminator free radical with the intiator free radical or a polymer free radical segment including the initiator free radical. Preferably, $R_1$ and $R_2$ are ethyl radicals for reasons of commercial availability.

Specific examples of compounds from which such nucleophiles can be formed include but are not limited to the following: sodium diethyldithiocarbamate, sodium dithiocarbamate, sodium N-methyl dithiocarbamate, sodium dimethylcarbamate, sodium N-ethyl dithiocarbamate, etc.

The reaction involving the incorporation of one or more photoiniferters on the SHPU or HPU having one or more pendant X' groups requires a polar organic solvent such as tetrahydrofuran, chloroform, dimethylsulfoxide or dimethylformamide. The polar solvent is utilized to dissolve the reaction components in order for the reaction to proceed. Agitation is typically employed throughout the reaction.

Generally, the reaction is carried out at a temperature ranging from about 20° C. to about 45° C., preferably from about 30° C. to about 35° C., in order to obtain optimum yield and a color free product. When the reaction temperature is less than about 20° C. the reaction proceeds too slowly. When the reaction temperature is greater than about 45° C. the reaction proceeds too quickly and discoloration can occur. In addition, in order to avoid the formation of iron dithiocarbamate and thus a discolored product there should not be any iron containing contaminants present when the photoiniferter is placed on the SHPU or HPU.

The reaction results in the formation of an inferter of the formula I(T)$_n$ wherein I, T, and n are as defined previously. The divalent organic linking group X which is incorporated into the iniferter I(T)$_n$ has the general formula:

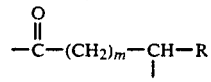

wherein R and m are as defined above.

V. Vinyl/SHPU and Vinyl/SHPU Copolymers and a Method of Preparing Using CSHPU and CHPU Macroiniferter Compounds

V(a) Vinyl/SHPU and Vinyl/HPU Copolymers of the Invention

The block and graft vinyl/SHPU and vinyl/HPU copolymers of the present invention have well-defined structures. The polyurethane block or segment provides a soft segment and the vinyl polymeric blocks or segments provide the hard segments of the copolymer. The chemical nature or composition of the vinyl polymeric blocks or segments can be modified to increase the Tg of the copolymer, to lower the surface energy of the copolymer, to impart adhesive properties to the copolymer, and to synthesize solvent resistant copolymers.

It is possible using the CSHPU and CHPU macroiniferter compounds to vary both the molecular weight and weight percent of the polyurethane backbone as well as the molecular weight and composition of the polymerized vinyl segments. Thus, various properties of the copolymers including durability of the copolymers can be tailored depending upon the intended end use of each particular copolymer. In addition, it is possible to go beyond the simple I(BT)$_n$ architecture to more complicated copolymer structures, such as I(BCT)$_n$ which is not possible when using non-iniferter polymerization techniques.

As indicated previously, T and the divalent linking group X are organic groups selected so that the T-X bond is capable of dissociating upon being subjected to an appropriate energy source to form a terminator free radical of the formula nT· and an initiator free radical of the formula I(·)$_n$. Useful organic groups T include but are not limited to xanthates and dithiocarbamates. Examples of xanthates useful as the organic group T include xanthates of the formula:

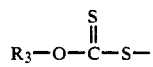

wherein $R_3$ is a monovalent moiety selected from the group consisting of $C_{1-4}$ alkyl, $C_{1-4}$ fluoralkyl including at least one fluorine atom, aryl, and substituted aryl.

Preferably, the organic group T is

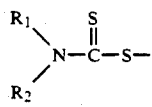

wherein $R_1$ and $R_2$ are as previously defined.

The molecular weight of each polymerized vinyl segment should range from about 2000 to about 100,000, preferably about 3,000 to about 10,000, in order to obtain the optimum dispersion viscosity of dispersions useful in preparing magnetic recording media which include the copolymer of the present invention. The combined molecular weights of the polyurethane backbone and the $SO_3M$, OH, and X groups should range from about 3000 to about 50,000, preferably about 5000 to about 15,000, in order to obtain the optimum dispersion viscosity of dispersions useful in preparing magnetic recording media which include the copolymer of the present invention.

The $T_g$ of the vinyl block(s) or segment(s) B of the copolymer of the present invention should range from about $-80°$ C. to about 150° C., preferably about 20° C. to about 120° C., and for magnetic binder use at least about 50° C., preferably about 50° C. to about 100° C., in order to obtain optimum hardening properties of the copolymer.

The preferred copolymers are those wherein B comprises at least one polymer block or segment comprising polymerized free radically polymerizable monomer selected from the group consisting of styrene, halogenated styrenes, alkylated styrenes, methoxystyrenes, acrylic acid, methacrylic acid, acrylonitrile, acrylamide, methacrylamide, methyl methacrylate, methyl acrylate, ethyl acrylate, isopropyl acrylate, n-butyl acrylate, 2-ethylhexyl acrylate, hydroxy ethyl acrylate, hydroxy ethyl methacrylate, hydroxy propyl acrylate, hydroxy propyl methacrylate, isobornyl acrylate, glycidyl acrylate, glycidyl methacrylate, hydroxyl ethyl acrylate, vinyl chloride, vinylidene chloride, vinyl acetate, vinylidene fluoride, N-ethylperfluorooctanesulfonamidoethyl acrylate, N-ethylperfluorooctanesulfonamidoethyl methacrylate, N-butylperfluorooctanesulfonamidoethyl acrylate, N-butylperfluorooctanesulfonamidoethyl methacrylate, N-methylperfluorooctanesulfonamidoethyl acrylate, N-methylperfluorooctanesulfonamidoethyl methacrylate, other acrylic and methacrylic acid esters and amides, and mixtures thereof.

The selection of the composition of B is typically based upon the intended use of the copolymer. Most preferably, B comprises a copolymer block comprising polymerized monomer selected from the group consisting of a mixture of styrene and 2-hydroxy ethyl methacrylate and a mixture of methyl methacrylate and 2-hydroxy ethyl methacrylate.

B, which is defined above, can comprise at least one homopolymer block or segment, copolymer block or segment, or multiblock or multisegment copolymer. Preferably, B comprises one copolymer block or segment for reasons of ease of synthesis and in order to obtain higher graft efficiency. B can also comprise a multiblock or multisegment copolymer wherein at least one block or segment of the multiblock copolymer is a homopolymer.

B can comprise two or more polymer blocks or segments formed from two or more separate monomer charges, respectively. Each monomer charge can comprise one or more different types of free radically polymerizable monomer. For example, B can comprise polymer block or segment B' which comprises polymerized monomer from a first free radically polymerizable monomer charge and polymer block or segment B" which comprises polymerized monomer from a second free radically polymerizable monomer charge.

VI. Preparation of the Vinyl/SHPU and Vinyl/HPU Copolymers of the Invention

The copolymerization of the free radically polymerizable monomer and the CSHPU or CHPU macroiniferter compound to produce the block and/or graft copolymers of the invention is by step-wise free radical polymerization. The free radically polymerizable monomer is dissolved in a suitable inert solvent, if needed, and mixed with CSHPU or CHPU macroiniferter compound. The monomer is polymerized by free radical polymerization utilizing the CSHPU or CHPU macroiniferter compound as a free radical initiator source.

A CSHPU or CHPU macroiniferter compound of the formula $I(T)_n$ wherein n is an integer of at least 1 and I and T are as previously defined is used to form the block and graft copolymers of the present invention. Preferably, n ranges from 1 to 10, most preferably 5 to 7, in order to optimize the number of T groups on the SHPU or HPU so that during the photopolymerization reaction a sufficient number of vinyl polymeric segments can be obtained. Generally, the weight ratio of the CSHPU or CHPU macroiniferter compound to the free radically polymerizable monomer ranges from about 5:95 to about 95:5, preferably about 20:80 to about 80:20. Generally, from about 0.01 to about 5 percent by weight of the T group of the CSHPU or CHPU macroiniferter compound of the general formula $I(T)_n$ is present based upon the total weight of the free radically polymerizable monomer.

The CSHPU or CHPU macroiniferter compound is mixed with a monomer charge comprising free radically polymerizable monomer which is capable of being polymerized in order to form a polymeric segment(s). The macroiniferter compound is caused to dissociate to form free radicals by exposure to an appropriate energy source. Preferably, the energy source is an electromagnetic radiation source capable of emitting radiation such as an ultraviolet energy source, a visible energy source, an electron beam, and the like. Most preferably, the energy source is an ultraviolet energy source. The particular energy source and its intensity are selected to result in the dissociation of the macroiniferter compound to free radicals. The intensity and rate of irradiation are chosen to advance the polymerization at a reasonable rate without deleteriously affecting the polymer segment being produced. An ultraviolet light source having a wavelength on the order of 300 to 500 nm, preferably 300 to 400 nm, spaced approximately 10 cm from the reactants to provide an exposure of 2 mW per square centimeter has been found to produce suitable results. Reaction times on the order of 2 to 50 hours have been found to be typical, depending upon the intensity of the radiation, with faster reaction times being observed at greater intensities.

Upon exposure to the energy source, the macroiniferter compound of the general formula $I(T)_n$ dissociates to form a terminator free radical of the formula $nT\cdot$ and an initiator free radical of the formula $I(\cdot)_n$, wherein I, T, and n are as previously defined. The exposure is maintained until the free radically polymerizable monomer polymerizes with the radical $I(\cdot)_n$ to form a free radical polymer segment represented by the formula $I(B\cdot)_n$ wherein B represents a polymeric segment formed of the free radically polymerizable monomer. The exposure is subsequently terminated to cause $I(B\cdot)_n$ and $nT\cdot$ to combine to form a polymer represented by the formula $I(BT)_n$.

It should be understood that minor amounts of the free radically polymerizable monomer used in forming the polymer blocks or segments may be present as a homopolymer in the copolymer composition. Such minor amounts of homopolymer may be produced in an unwanted side reaction during polymerization of the copolymer. Such amounts will typically be less than 5 parts by weight of all the homopolymer based upon 100 parts by weight of the copolymer.

The reactants and any solvent employed are charged into an energy source-transparent vessel and therein subjected to the energy source. If the energy source is ultraviolet light radiation, a suitable ultraviolet light-transparent vessel is utilized. The reaction is preferably conducted in a vessel with agitation to permit uniform exposure of the reactants to the energy source. While most of the reactions have been conducted by employing a batch process, it is possible to utilize the same technology in a continuous polymerization operation.

The reaction mixture may include a suitable inert solvent but it is not necessary since many of the monomeric materials are liquid themselves and may thus be charged into the reaction vessel without utilization of a solvent. The solvent, if utilized in the free radical polymerization, may be any substance which is liquid in a temperature range of about $-10°$ C. to about $50°$ C., is substantially transparent to the energy source employed to permit dissociation of the iniferter to form free radicals, is inert to the reactants and product, and will not otherwise adversely affect the reaction. Examples of suitable solvents include but are not limited to water, ketones such as methyl ethyl ketone, alkyl acetates such as ethyl acetate, alkanes such as hexane and heptane, alcohols such as methanol and ethanol, aromatic hydrocarbons such as toluene and benzene, and mixtures thereof. Other solvent systems are also useful. The amount of solvent is generally about 30 to 80 percent by weight based on the total weight of the reactants and solvent. In addition to solution polymerization herein described, the copolymerization may be carried out by other well known techniques such as suspension, emulsion and bulk polymerization.

VII. Preparation of Dispersions of Magnetic Powder

Dispersions useful for preparing the magnetic recording media of the present invention generally comprise a magnetic or magnetizable pigment and the curable vinyl/SHPU and/or vinyl/HPU copolymer (i.e., binder) described above in an appropriate solvent system. The dispersion, to which a curing agent is typically added, can be readily applied or coated onto a suitable substrate. A variety of materials can be utilized as the substrate including polyesters, cellulose acetates, polyvinylchlorides, and the like. A variety of solvent systems known in the art can be utilized including polar aprotic solvents used in preparing the copolymer such as tetrahydrofuran, ketones such as methyl ethyl ketone, organic esters such as ethyl acetate, and the like.

Addition of wetting agents or dispersing agents can generally be avoided when using vinyl/SHPU, even with relatively high load situations, e.g., about 70% to 85%, or more, by weight of magnetic pigment, based on the weight of the total solids of the dry coating, and high density situations, e.g., at least about 30,000 flux changes per inch. A variety of pigments can be used including: ferric oxides; gamma ferric oxide, cobalt doped gamma ferric oxides; chromium oxide; iron; iron-cobalt; cobalt; nickel; cobalt-nickel; cobalt-phosphorus; and barium ferrite. It is foreseen that a variety of loadings, densities, solvent systems, etc. can be used. The following conditions are typical: about 100 parts by weight of fine pigment such as $(Co-\gamma-Fe_2O_3)$ having a surface area 50 $m^2/g$ and a powder coercivity of 780 Oersted; about 15 to 40 parts by weight of binder (i.e., copolymer); and about 150 to 400 parts by weight of solvent can be combined with steel milling media and milled by agitation in a steel container until the pigment is dispersed. The dispersion can be readily cured with a multi-functional isocyanate curing agent. After the dispersion containing pigment, solvent, and binder is prepared, a curing agent is typically added. An example of a typical curative is a triisocyanate such as the 3:1 adduct of toluene diisocyanate with trimethylol propane. One such commercially available material has the trade designation "Mondur" CB-601, from Mobay Chemical Company. (CB-601 is a toluene diisocyanate-based adduct of unspecified triols and diols which contains 10.4% NCO and is supplied as a 60% solution in ethylene glycol diacetate.) The curative is preferably added in a proportion of about 1-20%, based upon the weight of the binder (i.e., copolymer). The resulting dispersion can be readily applied to a polymeric backing, e.g., polyethylene terephthalate, using a knife coating method. In some applications, e.g., back-coat, magnetic particles need not be used in the binder composition. Immediately after coating, and while the solvent is still present and the binder is substantially uncured, the coated substrate typically undergoes orientation in a magnetic field to align the magnetic praticles. After coating and orienting, the substrate is dried of solvent and cured. A cure can be effected either at room temperature or at elevated temperatures ($50°-60°$ C.). The curing retains the pigment in the oriented manner. Preferably, the magnetizable pigment is oriented to a squareness ratio of at least about 0.75.

A variety of additives can be incorporated into the dispersions useful in the present invention. These include head-cleaning agents and lubricants. If the binders described herein are used as a back-coat for magnetic media, the back-coat can include non-magnetizable pigments, such as, for example, carbon black, graphite, aluminum oxide, titanium dioxide, zinc oxide, silica gel, calcium carbonate, and barium sulfate. The binders described herein can be used to prepare magnetic media such as tapes, e.g., video tapes, computer tape and data cartridge tape, and diskettes, both single-sided and double-sided.

Dispersions of vinyl/HPU block and graft copolymers can be prepared according to the method described above for preparing vinyl/SHPU dispersions except for the addition of an effective amount of a suitable dispersing agent, preferably about 1 to about 10 weight percent based upon the pigment weight in order to disperse the pigment. Suitable dispersants are known to those skilled in the art and include lecithin and quaternary ammonium acetates or phosphates such as Emcol ™ acetate, a polypropylene oxide adduct of diethyl ethanolamine quarternized with ethylene oxide and acetic anhydride, having a molecular weight of about 2300, and Emcol ™ phosphate, a polypropylene oxide adduct of diethyl ethanolamine quarternized with ethylene oxide and phosphoric acid, both available from Witco Chemical Co., and disclosed in U.S. Pat. No. 4,837,082 incorporated by reference herein.

About 1 to about 10 weight percent of a wetting agent can also be included based upon the weight of the pigment. Suitable wetting agents are known to those skilled in the art and include phosphoric acid esters such as mono-phosphorylated propylene oxide adducts of glycerine, e.g., the reaction product of 1 mole of phosphorous oxychloride with the reaction product of 10–11 moles of propylene oxide and 1 mole of glycerine.

The magnetic recording medium comprising vinyl/HPU is preferably prepared by mixing crude particulate solid pigment into a mixture comprised of solvent, wetting agent, and dispersing agent. At least a portion of the cross-linkable copolymer is then added to form a wetting slurry. The wetting slurry is then milled until the average particle size of the crude magnetic particles is small enough such that the dispersion exhibits the desired smoothness. Any remaining copolymer and additional fluidizing solvents can be added after milling. The milling process will yield a stable dispersion of finely divided magnetic particles dispersed in a fluidizing solvent, the binder polymer contributing to the quality of the dispersion. This stable dispersion is then mixed with the cross-linker to form a curable composition. The curable composition can then be coated on a support base and allowed to cure.

EXAMPLES

The following detailed description includes exemplary preparations of CSHPU and CHPU iniferter compounds and copolymers made therewith. All parts and percentages throughout the Specification including the Examples are by weight unless otherwise specified.

Definition of Terms

Molecular Weight

The number average molecular weight ($\overline{M}_n$) and weight average molecular weight ($\overline{M}_w$) are well-known mathematical descriptions of the molecular weight distribution of a polymer sample.

Polydispersity

The polydispersity, abbreviated $\rho$, is a measure of the molecular weight distribution of a polymer and is defined as $\overline{M}_w/\overline{M}_n$.

Glass Transition Temperature

The glass transition temperature ($T_g$) is a well known temperature at which amorphous material changes from a glassy state to a ductile state. The glass transition temperature refers to the temperature of the peak tan-delta measured by an autovibron, in the uncured state. A high $T_g$ indicates good performance medium durability.

Each of the foregoing is a well-known term used by polymer chemists and others. Further explanation of the derivation of these terms may be found in J. F. Rabek's *Experimental Methods in Polymer Chemistry*,- Wiley and Sons, 1981, Chapter 3 entitled "Molecular Weight Averages", pages 57–61.

Equivalent Weight

The term "equivalent weight" as used herein and with respect to a functionality or moiety, refers to the mass of polymer per mole, or equivalent, of functionality.

Test Methods

The test methods used to evaluate the copolymers of the Examples are industry standard tests. The test methods which characterize the copolymers are those which demohstrate its molecular architecture. The gel permeation chromatography (GPC) and differential scanning calorimetry (DSC) measurement results have been obtained. The standard tests are described in detail in various publications of the American Society for Testing and Materials (ASTM), Philadelphia, PA. The standard test methods are described in detail below. The reference source of each of the standard test methods is also given.

Gel Permeation Chromatography

The characterization of the molecular weight distribution of the polymers has been by conventional gel permeation chromatography (GPC). A Hewlett-Packard Model 1084B, high performance liquid chromatograph equipped with Styrgel ™ columns was used. The system was calibrated using polystyrene standards. All molecular weight averages are polystyrene equivalent molecular weights. The molecular weight averages and polydispersities were calculated according to accepted practices. GPC test methods are further explained in "Modern Size Exclusion Liquid Chromatography" *Practice of Gel Permeation Chromatography*, John Wiley and Sons, 1979.

Differential Scanning Calorimetry

A small amount of dried film was placed in the DSC chamber of a Perkin-Elmer DSC-2 differeential scanning calorimeter under nitrogen atmosphere. The sample was cooled from room temperature to $-50°$ C. and then heated to 150° C. at 20° C. per minute. The $T_g$ was taken as the midpoint of the curve in the glass transition region.

Magnetic Dispersion Viscosity

Magnetic dispersion viscosity was measured to provide a comparison of the ease of flow of the dispersion. The magnetic dispersion viscosity was measured on a Brookfield viscometer model LVTD (Brookfield Engineering Laboratories, Inc.) using spindle LV-3. In general, magnetic dispersions of relatively high dispersion viscosity have been ineffective and/or inefficient for obtaining high quality magnetic recording media under certain circumstances, for example, low solvent, high load by weight, and/or high load by particle population density circumstances, or when a high squareness ratio is needed.

Inherent Viscosity

The inherent viscosity of each composition was measured to provide a comparison of the molecular weight of each composition. The inherent viscosity was measured by conventional means using a Wescan #50 viscometer in a water bath controlled at 25° C to measure the flow time of 10 milliliters of a polymer solution (0.8 grams per deciliter of polymer in a tetrahydrofuran solvent) and the flow time of the solvent. In each experiment, inherent viscosity is reported in deciliters per gram.

% Cure

Percentage cure refers to the ratio of the amount of binder unextracted in tetrahydrofuran in the cured state to the amount of binder extracted in tetrahydrofuran in the uncured state as measured by gel permeation chromatography (GPC). High % cure means good performance of media on durability.

EXAMPLES

EXAMPLE 1

Synthesis of HPU

The preparation of hydroxy-functional polyurethane was carried out in a 22-liter, three-neck reaction flask heated by a variac-controlled heating mantle and fitted with a thermometer, mechanical stirrer, and a condenser with a means for introducing and maintaining an inert nitrogen atmosphere above the reactant mixture. A charge of 673.6 g of isophorone diisocyanate, 1300 g of a polytetramethyleneoxide diol having a molecular weight of about 100 g/mol (available from duPont as Teracol TM 1000), 305.6 g of 1,4 cyclohexanedimethanol, 28.08 g of glycerol, 3,460 g of MEK and 0.46 g of dibutyltin dilaurate were introduced into the 22-liter reaction flask which had been first flushed with nitrogen and the nitrogen atmosphere was maintained. The mixture was heated at reflux under nitrogen atmosphere until no isocyanate was detectable by infrared spectroscopic examination. This required about one hour of heating at reflux. At that point the inherent viscosity determined in MEK was 0.15. An additional charge of 75.01 g of isophorone diisocyanate was made and heating at reflux was continued for one hour at which time no isocyanate was detectable by infrared spectroscopic examination. The inherent viscosity was determined to be 0.21. Charging of isophorone diisocyanate increments was continued until an inherent viscosity of from 0.23 to 0.33 was achieved. A sample of the resulting polyurethane exhibited a glass transition temperature of $-32°$ C., a weight average molecular weight of 45,092, and a hydroxy equivalent weight of 3680.

EXAMPLE 2

Synthesis of Macroiniferter CHPU

Into a 250 ml 3-neck flask equipped with a mechanical stirrer, an addition funnel, and a $N_2$ inlet were charged 70.0 g of HPU (40.0% solids in MEK) prepared according to the procedure of Example 1 and 2.00 g of triethylamine. Next, 2.0 g of 2-chloropropionyl chloride which was dissolved in 20.0 g of MEK was placed in the funnel. The latter solution was added dropwise to the soution contained in the flask over a 45–60 minute time period at 0° C. The flask contents were stirred for 2–3 hours at room temperature after all of the 2-chloropropionyl chloride solution had been added. The completion of the reaction was evaluated with gas chromatography/mass spectroscopy (GC/MS).

Next, MEK was evaporated off and was replaced with an equal amount of THF. To the above obtained slurry was added 3.0 g of sodium diethyldithiocarbamate dissolved in 50.0 g of THF. The resultant mixture was stirred for 5–6 hours at 30°–35° C. At this point the material was purified by extraction. The slurry was transferred to a 1-liter separatory funnel to which was added 180 g of a 5 wt-% NaCl solution in deionized $H_2O$. The funnel was shaken vigorously and left to stand for 20 minutes. Two layers were obtained; the lower $H_2O$ layer was discarded. The process was repeated an additional time. The layer obtained was stored over drying agent $MgSO_4$ for about 2–3 hours. The solution was filtered through ordinary filter paper in order to obtain a clear solution containing the CHPU.

EXAMPLES 3(a)–(b)

Synthesis of SHPU

EXAMPLE 3(a)

Preparation of Sulfonate Monomer 67.77 kilograms of Tone TM 0210 polycaprolactone (164 equivalents), 8.16 kilograms of toluene, and 5.72 kilograms of DMSSIP (39 equivalents) were combined and then heated to 80° C. with distillation of toluene. The remainder of the toluene was removed under vacuum at 110° C. The vacuum was released under nitrogen and 40 grams of tetrabutyltitanate was added. The system was then heated to 200° C. under nitrogen and held for 3 hours while collecting methanol distillate. After cooling to 120° C., a vacuum was pulled on the reaction mixture and these conditions were held for 4 hours. The product was filtered and cooled. The hydroxy equivalent weight by analysis was determined to be 603 grams/equivalent. The sulfonate equivalent weight was calculated to be 3745 grams/equivalent.

CONTROL EXAMPLE 3(b)

Preparation of SHPU 92 kilograms of MEK, 4.0 kilograms of neopentyl glycol (76.3 equivalents), and 15.9 kilograms of sulfonate monomer prepared according to Example 3(a) (30.9 equivalents) were combined and 14 kilograms of MEK were distilled off. 17.4 kilograms of methylene di-p-phenylene isocyanate (MDI) (139.4 equivalents) and 23 grams of dibutyltindilaurate were added. The reaction was held at 35° C. for 3 hours whereupon the prepolymer solution obtained was drained to a clean dry holding container.

22 kilograms of MEK and 12.1 kilograms of Tone TM 305 triol (66.6 equivalents) were combined in the reaction vessel whereupon the prepolymer solution was added to the reaction mixture with stirring. After the isocyanate had reacted, a further addition of 1.3 kilograms of MDI gave a final inherent viscosity in tetrahydrofuran of 0.29. The product had a hydroxy equivalent weight measured to be 1700 grams/equivalent and the sulfonate equivalent weight was calculated to be 11,000 grams/equivalent.

EXAMPLE 4

Synthesis of Macroiniferter CSHPU

Into a 250 ml 3-neck flask equipped with a mechanical stirrer, an addition funnel, and a $N_2$ inlet were charged 154.0 g of SHPU (36% solids in THF) made according to the procedure of Example 3 and 2.56 g of triethylamine. Next, 2.56 g 2-chloropropionyl chloride dissolved in 48.0 g of THF was placed in the addition funnel. The latter solution was added dropwise to the solution contained in the flask over a 45–60 minute time period at 0° C. A white solid began to appear due to the formation of $Et_3NH^+Cl^-$. The flask contents were stirred for 2–3 hours at room temperature after all of the 2-chloropropionyl chloride solution had been added.

The completion of the reaction was evaluated with GC/MS.

To the above obtained slurry was added 3.0 g of sodium diethyldithiocarbamate dissolved in 50.0 g of THF. The resultant mixture was stirred for 5-6 hours at 30°-35° C. At this point the material was purified by extraction. The slurry was transferred to a 1-liter separatory funnel to which was added 180 g of a 5 wt-% NaCl solution in deionized $H_2O$. The funnel was shaken vigorously and left to stand for about 20 minutes. Two layers were obtained; the lower $H_2O$ layer was discarded. The process was repeated an additional time. The layer obtained was stored over drying agent $MgSO_4$ for about 2-3 hours. The solution was filtered through ordinary filter paper in order to obtain a clear solution containing the CSHPU.

EXAMPLE 5

The copolymer obtained was combined with CB-601 isocyanate curing agent and coated according to the procedure of Example 5. The percentage cure at room temperature was measured and set forth in Table I.

EXAMPLE 7

Copolymerization of MMA/HOEA/GM with CHPU

The procedure of Example 5 was repeated. The charges of the components were as follows: CHPU prepared according to Example 2 (41.0 g, 24% solids in THF), MMA (2.0 g), hydroxyl ethyl acrylate (HOEA) (3.0 g), glycidyl methacrylate (GM) (0.5 g). The solution was photolyzed for 42 hours in order to obtain 80-85% conversion. DSC, GPC, OH equivalent weight and other pertinent results obtained from the evaluation of the CHPU/MMA/HOEA/GM are given in Table I.

TABLE I

| Example | Appearance | Tg °C. | Mn | Mw | Polydispersity | Inherent Viscosity in THF | OH Equivalent Weight | Percentage Cure At Room Temperature For 7 Days With Isocyanate Curing Agent CB 601 |
|---|---|---|---|---|---|---|---|---|
| 3. SHPU | clear | 20 | 6170 | 21925 | 3.6 | 0.295 | 1700 | — |
| 4. CSHPU | clear | 22 | 6250 | 24800 | 3.9 | 0.277 | — | — |
| 5. CSHPU/MMA/HEMA | clear | 60 | 9510 | 41457 | 4.4 | 0.254 | 1104 | 82% |
| 6. CSHPU/STY/HEMA | clear | 50 | 8867 | 26503 | 3.0 | 0.30 | 1032 | 78% |
| 7. CHPU/MMA/HOEA/GM | clear | 40 | — | — | — | 0.26 | 1000 | 84% |

Copolymerization of MMA/HEMA with CSHPU 100.0 g (20% solids in THF) of CSHPU was combined with 31.6 g of methyl methacrylate (MMA) and 5.0 g of 2-hydroxy ethyl methacrylate (HEMA) in a 240 ml clear glass jar and the resulting solution was purged with $N_2$ at ice temperature. The sealed glass jar was placed in a roller mechanism and was exposed for 16 hours to ultraviolet light radiation from 6 General Electric 15 watt cylindrical black light lamps. The reaction bottle was removed from the roller mechanism and unsealed to determine the exact conversion by measuring the percentage solids. Conversion in the range of 92-95% was obtained. DSC, GPC, OH equivalent weight, and other pertinent results obtained from the evaluation of the CSHPU/MMA/HEMA copolymer obtained are given in Table I.

The copolymer obtained was combined with CB 601 triisocyanate cross-linking agent available from Mobay Chemical Company at a weight ratio of 90:10 in order to cross-link the copolymer via the hydroxy groups. The resulting cross-linked copolymer solution was coated on silicone lined paper. The coated sheet was conditioned for 4-5 days at 21° C. and 50% relative humidity (R. H.). The percentage cure at room temperature was measured and set forth in Table I.

EXAMPLE 6

Copolymerization of STY/HEMA with CSHPU

The procedure of Example 5 was repeated. The charges of the components were as follows: CSHPU (125.0 g, 20% solids in THF), styrene (STY) (44.0 g), and HEMA (5.44 g). The solution was photolyzed for about 40 hours in order to obtain 80-85% conversion. DSC, GPC, OH equivalent weight, and other pertinent results obtained from the evaluation of the CSHPU/STY/HEMA copolymer obtained are given in Table I.

EXAMPLE 8

The purpose of Example 8 was to demonstrate the application of the vinyl/SHPU copolymers of the invention as binders in magnetic recording media. Two separate binder dispersion compositions were prepared. The following ingredients were separately introduced into a 0.15 liter stainless steel milling container and mixed and dispersed therein, with steel media, for 8 hours in order to form two separate dispersions: Co-gamma-$Fe_2O_3$ (specific surface area:50 $m^2$/g, powder coercivity of 780 Oersted (100.0 parts), binder (25.0 parts), myristic acid (2.5 parts), butyl stearate (1.0 parts), THF (92.6 parts), methyl ethyl ketone (93.0 parts), and cyclohexanone (46.4 parts). For Dispersion A the binder used was CSHPU/STY/HEMA prepared according to Example 6. For Dispersion B the binder used was CSHPU/MMA/HEMA prepared according to Example 5.

The resulting dispersions were applied to films of a polyethylene terephthalate (thickness: 25 micrometers) by means of knife coating and the resulting coated films were allowed to stand in a parallel magnetic field of 1400 Oersted for about one second. The magnetic layers obtained had thicknesses of about 5 micrometers. The dispersions for preparing the tapes of the foregoing examples were evaluated for viscosity. The squareness ratio, % cure, and glass transition temperatures of the magnetic coatings of the tapes prepared in the foregoing examples were also measured. The results are set forth in Table III.

TABLE III

| Properties | Dispersion A | Dispersion B |
|---|---|---|
| Viscosity of magnetic dispersion at 0 day, cps | 11,640 | 9400 |
| Viscosity of magnetic dispersion at 12 days cps | 12,920 | 10,670 |

TABLE III-continued

| Properties | Dispersion A | Dispersion B |
| --- | --- | --- |
| Squareness ratio of magnetic coating at 0 day | 0.782 | 0.780 |
| Squareness ratio of magnetic coating at 12 days | 0.781 | 0.783 |
| % cure at 25° C. for 7 days | 80 | 55 |
| % cure at 60° C. for 3 days | 97 | 90 |
| Glass transition temperature, °C. at 60° C. for 3 days | 92 | 98 |

The data contained in Table III demonstrates the good properties obtained, including the high glass transition temperatures obtained, using binder compositions containing the copolymers of the invention.

While this invention has been described in connection with specific embodiments, it should be understood that it is capable of further modification. The claims herein are intended to cover those variations which one skilled in the art would recognize as the chemical equivalent of what has been described here.

What is claimed is:

1. An iniferter compound of the formula $I(T)_n$ wherein
   I represents the free radical initiator portion of the iniferter compound and wherein I comprises a hydroxy-functional polyurethane polymer which comprises:
   (i) a polyurethane backbone;
   (ii) at least two cross-linkable hydroxy groups pendant from the polyurethane backbone, wherein the polyurethane backbone has a hydroxy equivalent weight of from about 500 to about 50,000;
   (iii) at least n organic groups X which can be the same or different pendant from the polyurethane backbone wherein each organic group X is also bonded to a T group;
   T represents the terminator portion of said iniferter; and
   n is an integer of at least 1;
   wherein T has the formula

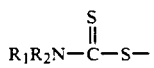

wherein $R_1$ and $R_2$ are monovalent moieties selected from the group consisting of hydrogen, $C_{1-4}$ alkyl, $C_{1-4}$ fluoroalkyl including at least one fluorine atom, aryl and substituted aryl, $R_1$ and $R_2$ being the same or different and being selected so that they will not prevent said initiator free radical from initiating free radical polymerization or the combining of said terminator free radical with said initiator free radical or a polymer free radical segment including said initiator free radical;
   or wherein T has the formula

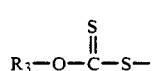

wherein $R_3$ is a monovalent moiety selected from the group consisting of $C_{1-4}$ alkyl, $C_{1-4}$ fluoroalkyl including at least one fluorine atom, aryl, and substituted aryl;
   and X has the general formula

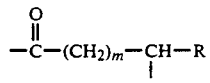

wherein R is a monovalent moiety selected from the group consisting of hydrogen, $C_{1-4}$ alkyl, $C_{1-4}$ fluoroalkyl including at least one fluorine atom, aryl and substituted aryl, and m is an interger of 0 to 10;
   wherein T and X are selected so that the T-X bond is capable of dissociating upon being subjected to a radiant energy source of forming a terminator free radical of the formula $nT\cdot$ and an initiator free radical of the formula $I(\cdot)_n$, said initiator free radical being sufficiently reactive to initiate free radical polymerization of free radically polymerizable monomer and said terminator radical being insufficiently capable of initiating free radical polymerization of free radically polymerizable monomer but capable of rejoining with said initiator free radical or a free radical polymer segment free radically polymerized with said initiator free radical.

2. The iniferter compound of claim 1 which further comprises at least one $SO_3M$ group pendant from the polyurethane backbone, wherein the polyurethane backgone has an $SO_3M$ equivalent weight of from about 2,000 to about 100,000, and wherein M is selected from the group consisting of $H^+$, $NR_4^+$ wherein R can be $H^+$ or an alkyl group, $Li^+$, $Na^+$, $K^+$, and mixtures thereof.

3. The iniferter compound of claim 2, wherein M is selected from the group consisting of $H^+$, $Li^+$, $Na^+$, $K^+$, and mixtures thereof.

4. The iniferter compound of claim 2, wherein the $SO_3M$ groups are aromatic $SO_3M$ groups.

5. The iniferter compound of claim 2, wherein:
   (a) the $SO_3M$ group equivalent weight of the polyurethane backbone ranges from about 5,000 to about 30,000; and
   (b) the hydroxy equivalent weight of the polyurethane backbone ranges from about 1,000 to about 5,000.

6. The iniferter compound of claim 1 wherein at least a majority of said hydroxy groups are pendant from hydrophobic polymer chain segments incorporated into said polyurethane backbone, and wherein said hydrophobic polymer chain segments incorporated into said polyurethane backbone comprise residues of a polyol having an average molecular weight of at least about 180, and wherein the hydrophobic polymer chain segments have a carbon atom to polar functionality of at least 3:1 and a hydroxy equivalent weight of at least about 60.

7. The iniferter compound of claim 1 wherein n is an integer ranging from about 1 to about 20.

8. The iniferter compound of claim 1 wherein T has the formula

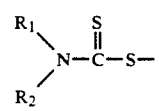

wherein $R_1$ and $R_2$ are monovalent moieties selected from the group consisting of hydrogen, $C_{1-4}$ alkyl, $C_{1-4}$ fluoralkyl including at least one fluorine atom, aryl and substituted aryl, $R_1$ and $R_2$ being the same or different and being selected so that they will not prevent said initiator free radical from initiating free radical polymerization or the combining of said terminator free radical with said initiator free radical or a polymer free radical segment including said initiator free radical.

9. The iniferter compound of claim 8 wherein $R_1$ and $R_2$ are ethyl moieties.

10. A copolymer comprising:
a copolymer of the formula $I(BT)_n$ which can be made by the utilization of an iniferter compound represented by the formula $I(T)_n$ wherein I represents the free radical initiator portion of the iniferter compound and wherein I comprises a hydroxy-functional poluurethane polymer which comprises:
  (i) a polyurethane backbone;
  (ii) at least two cross-linkable hydroxy groups pendant from the polyurethane backbone, wherein the polyurethane backbone has a hydroxy equivalent weight of from about 500 to about 50,000;
  (iii) at least n organic groups X which can be the same or different pendant from the polyurethane backbone wherein each organic group X is also bonded to a T group;

T represents the terminator portion of said iniferter; and n is an integer of at least 1;

wherein T has the formula

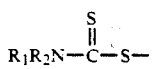

wherein $R_1$ and $R_2$ are monovalent moieties selected from the group consisting of hydrogen, $C_{1-4}$ alkyl, $C_{1-4}$ fluoroalkyl including at least one fluorine atom, aryl and substituted aryl, $R_1$ and $R_2$ being the same or different and being selected so that they will not prevent said initiator free radical from initiating free radical polymerization or the combining of said terminator free radical with said initiator free radical or a polymer free radical segment including said initiator free radical;
or wherein T has the formula

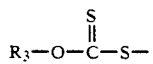

wherein $R_3$ is a monovalent moiety selected from the group consisting of $C_{1-4}$ alkyl, $C_{1-4}$ fluoroalkyl including at least one fluorine atom, aryl, and substituted aryl;
and X has the general formula

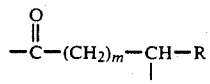

wherein R is a monovalent moiety selected from the group consisting of hydrogen, $C_{1-4}$ alkyl, $C_{1-4}$ fluoroalkyl including at least one fluorine atom, aryl and substituted aryl, and m is an integer of 0 to 10; wherein T and X are selected so that the T—X bond is capable of dissociating upon being subjected to a radiant energy source of forming a terminator free radical of the formula $nT\cdot$ and an initiator free radical of the formula $I(\cdot)_n$, said initiator free radical being sufficiently reactive to initiate free radical polymerization of free radically polymerizable monomer and said terminator radical being insufficiently capable of initiating free radical polymerization of free radically polymerizable monomer but capable of rejoining with said initiator free radical or a free radical polymer segment free radically polymerized with said initiator free radical; and B represents at least one polymer segment comprising polymerized free radically polymerizable monomer; wherein the weight ratio of said iniferter to said free radically polymerizable monomer ranges from about 5:95 to about 95:5.

11. The copolymer of claim 10 which further comprises at least one $SO_3M$ group pendant from the polyurethane backbone wherein the polyurethane backbone has an $SO_3M$ equivalent weight of from about 2,000 to about 100,000, and wherein M is selected from the group consisting of $H^+$, $NR_4^+$ wherein R can be $H^+$ or an alkyl group, $Li^+$, $Na^+$, $K^+$, and mixtures thereof.

12. The copolymer of claim 10 or 11 wherein at least a majority of said hydroxy groups are pendant from hydrophobic polymer chain segments incorporated into said polyurethane backbone and wherein said hydrophobic polymer chain segments incorporated into said polyurethane backbone comprise residues of a polyol having an average molecular weight of at least about 180, and wherein the hydrophobic polymer chain segments have a carbon atom to polar functionality of at least 3:1 and a hydroxy equivalent weight of at least about 60.

13. The copolymer of claim 10 or 11 wherein B has a glass transition temperature of at least about 50° C.

14. The copolymer of claim 10 or 11 wherein said free radically polymerizable monomer is selected from the group consisting of styrene, halogenated styrenes, alkylated styrenes, methoxystyrenes, acrylic acid, methacrylic acid, acrylonitrile, acrylamide, methacrylamide, methyl methacrylate, methyl acrylate, ethyl acrylate, isopropyl acrylate, n-butyl acrylate, 2-ethylhexyl acrylate, hydroxy ethyl acrylate, hydroxy ethyl methyl acrylate, hydroxy propyl acrylate, hydroxy propyl methacrylate, isobornyl acrylate, glycidyl acrylate, vinyl chloride, vinylidene chloride, vinyl acetate, vinylidene fluoride, N-ethylperfluorooctanesulfonamidoethyl acrylate, N-ethylperfluorooctanesulfonamidoethyl methacrylate, N-butylperfluorooctanesulfonamidoethyl acrylate, N-butylperfluorooctanesulfonamidoethyl methacrylate, N-methylperfluorooctanesulfonamidoethyl acrylate, N-methylperfluorooctanesulfonamidoethyl methacrylate, and mixtures thereof.

15. The copolymer of claim 10 or 11 wherein the free radically polymerizable monomer is selected from the group consisting of a mixture of methyl methacrylate and 2-hydroxy ethyl methacryalte and a mixture of styrene and 2-hydroxy ethyl methacrylate.

16. A method of making a copolymer which comprises the steps of:
(a) mixing with (1) iniferter compound represented by the general formula $I(T)_n$ wherein
I represents the free radical initiator portion of the iniferter compound and wherein I comprises a hydroxy-functional polyurethane polymer which comprises:

(i) a polyurethane backbone;
(ii) at least two cross-linkable hydroxy groups pendant from the polyurethane backbone, wherein the polyurethane backbone has a hydorxy equivalent weight of from about 500 to about 50,000;
(iii) at least n organic groups X which can be the same or different pendant from the polyurethane backbone wherein each organic group X is also bonded to a T group;

T represents the terminator portion of said iniferter; and
n is an integer of at least 1;
wherein T has the formula

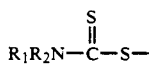

wherein $R_1$ and $R_2$ are monovalent moieties selected from the group consisting of hydrogen, $C_{1-4}$ alkyl, $C_{1-4}$ fluoroalkyl including at least one fluorine atom, aryl and substituted aryl, $R_1$ and $R_2$ being the same or different and being selected so that they will not prevent said initiator free radical from initiating free radical polymerization or the combining of said terminator free radical with said initiator free radical or a polymer free radical segment including said initiator free radical;
or wherein T has the formula

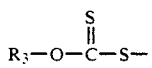

wherein $R_3$ is a monovalent moiety selected from the group consisting of $C_{1-4}$ alkyl, $C_{1-4}$ fluoralkyl including at least one fluorine atom, aryl, and substituted aryl;
and X has the general formula

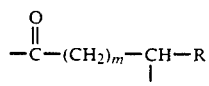

wherein R is a monovalent moiety selected from the group consisting of hydrogen, $C_{1-4}$ alkyl, $C_{1-4}$ fluoroalkyl including at least one fluorine atom, aryl and substituted aryl, and m is an integer of 0 to 10;
wherein T and X are selected so that the T—X bond is capable of dissociating upon being subjected to a radiant energy source of forming a terminator free radical of the formula nT· and an initiator free radical of the formula $I(\cdot)_n$, said initiator free radical being sufficiently reactive to initiate free radical polymerization of free racially polymerizable monomer and said terminator racial being insufficiently capable of initiating free radical polymerization of free radically polymerizable monomer but capable of rejoining with said initiator free radical or a free radical polymer segment free radically polymerized with said initiator free radical and (2) a monomer charge comprising free radically polymerizable monomer capable of being polymerized in order to form a polymeric segment; at a weight ratio of iniferter to free radically polymerizable monomer of about 5:95 to about 95:5, in order to form a mixture;

(b) exposing the mixture of (a) to an energy source capable of forming free radicals nT· and $I(\cdot)_n$;
(c) maintaining the exposure of (b) until said free radically polymerizable monomer polymerizes with the radical $I(\cdot)_n$ to form a free radical polymer segment represented by the formula $I(B\cdot)_n$ wherein B represents a polymeric segment formed of said free radically polymerizable monomer;
(d) terminating said exposure whereby to cause $I(B\cdot)_n$ and nT· to combine to form a copolymer represented by the formula $I(BT)_n$.

17. The copolymer formed according to the method of claim 16.

18. The method of claim 16 wherein said iniferter further comprises at least one $SO_3M$ group pendant from the polyurethane backbone, wherein the polyurethane backbone has an $SO_3M$ equivalent weight of from about 2,000 to about 100,000, and wherein M is selected from the group consisting of $H^+$, $NR_4^+$ wherein R can be $H^+$ or an alkyl group, $Li^+$, $Na^+$, $K^+$, and mixtures thereof.

19. The copolymer formed according to the method of claim 18.

UNITED STATES PATENT AND TRADEMARK OFFICE
CERTIFICATE OF CORRECTION

PATENT NO.: 5,240,972

DATED: August 31, 1993

INVENTOR(S): Ramesh C. Kumar et al.

It is certified that error appears in the above-identified patent and that said Letters Patent is hereby corrected as shown below:

Col. 8, line 37, "SO M" should read --$SO_3M$--.

Col. 10, line 23, "dio" should read --diol structure--.

Col. 12, line 42, "X," should read --X'--.

Col. 14, line 50, "Compound" should read --compound--.

Col. 16, line 21, replace the second occurrence of "Vinyl/SHPU" with --Vinyl/HPU--.

Col. 20, line 39, "praticles" should read --particles--.

Col. 22, line 8, "demohstrate" should read --demonstrate--.

Col. 23, line 53, "soution" should read --solution--.

Col. 32, line 10, "racial" should read --radical--.

Signed and Sealed this

Thirtieth Day of July, 1996

BRUCE LEHMAN

*Attest:*

*Attesting Officer*     *Commissioner of Patents and Trademarks*